US006819245B1

(12) United States Patent
Dilling

(10) Patent No.: US 6,819,245 B1
(45) Date of Patent: Nov. 16, 2004

(54) SECURITY SYSTEM

(76) Inventor: Emery W. Dilling, 6800 Austin Center Blvd., Number 761, Austin, TX (US) 78731

( * ) Notice: Subject to any disclaimer, the term of this patent is extended or adjusted under 35 U.S.C. 154(b) by 383 days.

(21) Appl. No.: 10/156,259

(22) Filed: May 27, 2002

(51) Int. Cl.[7] ............................................. G08B 13/14
(52) U.S. Cl. .................. 340/572.1; 340/901; 340/902; 340/903; 340/904; 340/906; 340/988; 340/436; 340/691.1; 340/691.3; 340/691.5; 340/435; 340/572.1; 340/572.3; 340/572.7; 701/45; 701/117; 701/301; 343/760; 343/878; 343/894
(58) Field of Search ............................ 340/572.1, 901, 340/902, 903, 906, 988, 436, 691.1, 691.3, 691.5, 435; 701/45, 117, 301; 343/760, 878, 894

(56) References Cited

U.S. PATENT DOCUMENTS

| 4,761,796 | A | 8/1988 | Dunn et al. |
| 4,818,998 | A | 4/1989 | Apsell et al. |
| 4,903,279 | A | 2/1990 | Murakami et al. |
| 4,908,629 | A | 3/1990 | Apsell et al. |
| 5,022,046 | A | 6/1991 | Morrow, Jr. |
| 5,235,329 | A | 8/1993 | Jackson |
| 5,363,108 | A | 11/1994 | Fullerton |
| 5,448,599 | A | 9/1995 | Gunmar |
| 5,495,243 | A | 2/1996 | McKenna |
| 5,889,475 | A | 3/1999 | Klosinski et al. |
| 5,920,194 | A | 7/1999 | Lewis et al. |
| 5,963,148 | A | 10/1999 | Sekine et al. |
| 6,160,493 | A | 12/2000 | Smith |
| 6,181,996 | B1 | 1/2001 | Chou et al. |
| 6,191,708 | B1 | 2/2001 | Davidson |
| 6,240,099 | B1 | 5/2001 | Lim et al. |
| 6,281,806 | B1 | 8/2001 | Smith et al. |
| 6,288,682 | B1 | 9/2001 | Thiel et al. |
| 6,292,724 | B1 | 9/2001 | Apsell et al. |
| 6,301,311 | B1 | 10/2001 | Sheba |
| 6,313,794 | B1 | 11/2001 | Rose |
| 6,313,795 | B1 | 11/2001 | Herrmann et al. |
| 6,320,514 | B1 | 11/2001 | Flick |
| 6,320,535 | B1 | 11/2001 | Hillman et al. |
| 6,323,566 | B1 | 11/2001 | Meier |
| 6,323,802 | B1 | 11/2001 | Tokoro |
| 6,326,903 | B1 | 12/2001 | Gross et al. |
| 6,327,257 | B1 | 12/2001 | Khalifa |
| 6,329,901 | B2 | 12/2001 | Brinkmeyer et al. |
| 6,330,452 | B1 | 12/2001 | Fattouche et al. |
| 6,331,825 | B1 | 12/2001 | Ladner et al. |
| 6,331,997 | B1 | 12/2001 | Li |
| 6,332,579 | B1 | 12/2001 | Ritter |
| 6,346,877 | B1 | 2/2002 | Flick |
| 6,351,246 | B1 | 2/2002 | McCorkle |
| 6,351,652 | B1 | 2/2002 | Finn et al. |
| 6,353,743 | B1 | 3/2002 | Karmel |

Primary Examiner—Daniel J. Wu
Assistant Examiner—Tai Tan Nguyen

(57) ABSTRACT

Vehicle security systems comprise at least one addressable transponder for communication with at least one base station. Each transponder and base station comprises a steerable directional antenna having an antenna azimuth sensor. Transponder and base station antenna azimuths assist in locating a vehicle carrying a transponder and allow near real-time estimation of vehicle heading. Base station networks facilitate location, tracking and/or interception of vehicles within a network geographic area. Use of multiple effective transmission ranges for transponders and/or base stations improves the accuracy of vehicle location.

20 Claims, 3 Drawing Sheets

SECURITY SYSTEM

BACKGROUND

Security systems are commonly available to monitor psychiatric patients, assist in confinement of prisoners, and track or discourage unauthorized use of aircraft, boats, cars, trucks, construction equipment, and other mobile high-value items (generally herein, "vehicles"). Relatively elaborate and costly security systems (including vehicle recovery systems) may allow locating and/or tracking such vehicles using satellite navigation systems linked to a terrestrial network and/or through use of a directional antenna to receive omnidirectional transmissions from the tracked vehicle. Still other systems merely provide for disabling a vehicle and/or activation of a local alarm carried by the vehicle (using, e.g., flashing lights, horn or siren). These security systems vary widely in cost and capability. They generally operate independently or as part of a network requiring the payment of fees.

Sophisticated tracking and/or interception systems allow remote determination of vehicle direction which is useful for tracking a vehicle. Examples of such systems are described in U.S. Pat. No. 6,326,903 B1, incorporated herein by reference. Direction references described in the '903 patent include those provided by magnetic compass and by using successive locations determined through GPS satellites. But GPS-based systems are relatively costly and complex, as noted above, and magnetic compasses are subject to significant potential errors due to magnetic declination as well as variable magnetic deviations resulting from magnetic materials and/or magnetic fields in the vicinity of the compass.

Other U.S. patents related to vehicle communications, security, tracking and/or monitoring include U.S. Pat. Nos. 4,818,998; 4,903,279; 4,908,629; 6,191,708; 6,292,724; 6,320,514; 6,320,535; 6,323,566; 6,326,903; 6,327,257; 6,329,901; 6,330,452; 6,331,825; 6,346,877; and 6,353,743, each incorporated herein by reference.

Taken together, the above examples and similar systems offer many useful features, but a single integrated system offering a comprehensive selection of features at a moderate price is not available. Such a system would provide timely, specific and effective security information locally and/or would communicate such information with one or more base stations spaced apart from the vehicle. Capabilities would include provisions for broad area coverage through a plurality of base stations, with coordinated monitoring of individual vehicle movement as well as control of traffic flow comprising one or more vehicles. Specific features underlying these capabilities would include, but not be limited to, means for estimating the location, heading, and speed of each vehicle, and its range from one or more base stations, in near real time.

SUMMARY

The present invention comprises at least one addressable transponder for receiving security information addressed to it from at least one base station, and for transmitting security information to at least one base station. A transponder preferably automatically acknowledges receipt of security information from a base station via a transmission to one or more base stations. Each such acknowledgment transmission comprises at least one transponder address corresponding to the receiving transponder.

Each addressable transponder comprises an addressable transponder receiver, an addressable transponder transmitter connected to the transponder receiver, and a transponder antenna connected to the transponder receiver and the transponder transmitter. Each transponder receiver comprises a discriminator for rejecting base station transmissions not addressed to that transponder, together with a decoder to decode security information encoded in base station transmissions addressed to the transponder. Further, each transponder transmitter comprises an encoder for encoding security information comprising the transponder's address in each transmission from that transponder.

And each transponder antenna comprises a steerable directional antenna and a steerable directional antenna azimuth sensor for providing security information comprising a transponder antenna azimuth indicative of each azimuth to which said steerable directional transponder antenna is steered.

The present invention also comprises at least one base station for receiving security information transmitted from at least one addressable transponder, for transmitting security information addressed to at least one such transponder, and for communicating security information with at least one operator.

Each base station comprises a base station transmitter, a base station receiver connected to the base station transmitter, a base station antenna connected to the base station transmitter and the base station receiver, and an operator interface connected to the base station transmitter and the base station receiver for bidirectional communication with at least one operator of security information (including security commands) received and/or transmitted by each base station.

Each base station receiver comprises a decoder to decode security information encoded in transmissions received from at least one addressable transponder. Further, each base station transmitter comprises an encoder for encoding security information comprising at least one transponder address in each transmission from that base station to at least one addressable transponder. And each base station antenna comprises a steerable directional antenna and a steerable directional antenna azimuth sensor for providing security information comprising a base station antenna azimuth indicative of each azimuth to which said steerable directional base station antenna is steered.

Transponder and base station antenna azimuths can provide valuable security information for locating and/or tracking a vehicle that carries the transponder. Thus, a transponder antenna is preferably mounted on a vehicle so that the transponder antenna azimuth is indicated by the antenna azimuth sensor relative to the vehicle (e.g., preferably relative to the direction of forward travel of the vehicle). A base station receiving a transmission of security information comprising such a transponder antenna azimuth can then estimate the heading of the vehicle in near real time.

Such vehicle heading estimates are made with respect to a (preferably previously established) base station antenna azimuth reference (for example, true north). By knowing both the azimuth of the base station antenna on which security information is received from the vehicle transponder, as well as the transponder antenna azimuth relative to the direction of forward travel of the vehicle, the heading of the vehicle with respect to the base station antenna azimuth reference (e.g., true north) may then be estimated as described herein below.

Heading information can reveal a vehicle's orientation in traffic, and may also be used in conjunction with other security information described herein to predict a future location of the vehicle. These functional capabilities can in turn facilitate control of traffic flow and/or allow the vehicle's interception and recovery. Note that since estimates of the vehicle heading in this example are made relative to the base station azimuth reference, the vehicle itself does not need an azimuth reference other than its own structure (as reflected, for example, in the vehicle's direction of forward travel). In particular, the vehicle does not require access to an external reference such as might be provided by a magnetic compass or GPS receiver.

Thus, use of steerable directional antennas in both base stations and transponders of the present invention provides operational advantages not obtainable in other systems without directional antennas or in systems relying on use of directional antennas at only one end of a vehicle communication link. One such advantage relates to vehicle location. Several well-known techniques for vehicle location rely on triangulation, which may also be employed in the present invention for tracking and/or locating a vehicle carrying an addressable transponder. But alternative approaches are needed because triangulation requires at least two base station antenna azimuths (or analogous measures), and these azimuths may not always be available for locating a vehicle. And when only one azimuth is available, the present invention provides for an alternative technique for vehicle location.

This alternative technique involves estimation of the range from a base station is (or tracking vehicle) to a tracked vehicle with which the base station (or tracking vehicle) is communicating. The effective range of such communications is controllable in the present invention, preferably as a predetermined variable for each transmission from a base station and/or addressable transponder. Thus, in preferred embodiments of the present invention, effective transmission range is established by a transmission range controller in each transponder and/or base station transmitter as a function of transmission power and/or bandwidth.

Such effective transmission range control can be used, for example, to estimate the locations of addressable transponders around a base station. To make these estimates, the base station will typically transmit a relatively long-range signal on each of a plurality of base station antenna azimuths (for example, on successive azimuths at ten-degree increments around a full circle). Each of these long-range signals will comprise an address corresponding to each addressable transponder sought to be contacted. Each addressable transponder, in turn, will preferably operate in a scan mode to detect base station signals arriving on any transponder antenna azimuth.

If one or more addressable transponders receive the base station's long-range signal, each receiving transponder will transmit an acknowledgement (including its address and the transponder antenna azimuth on which the signal was received) back to the base station. By noting the minimum effective range and base station antenna azimuth used to contact a particular transponder, the base station operator can estimate the location (i.e., the azimuth and range) of the transponder. Successive base station transmissions to that transponder at incrementally reduced or increased effective ranges will allow refinement of the range estimate (for example, by incrementally reducing effective range until the transponder is just out of range so that the transponder just fails to acknowledge a base station transmission).

Thus, security information comprising parameters such as effective ranges, antenna azimuths and/or transponder addresses is used frequently in the present invention. But these parameters may be augmented to include, for example, the speed of a vehicle-mounted transponder estimated by use of the vehicle's speedometer. And another useful parameter that is readily obtained is the closing velocity of a vehicle-mounted transponder with a base station. This closing velocity may be estimated based on Doppler shift in transmissions from the transponder to the base station or vice versa.

Closing velocity may also be estimated by alternative means, including calculation of the component of vehicle speed directed toward or away from a base station through use of the vehicle's speedometer and its transponder antenna azimuth (reflecting the angle between the direction of forward vehicle speed and the line of communication with the base station) as described herein. In the special case where both the base station and the vehicle are mobile, the closing velocity of a vehicle with a base station would reflect the algebraic sum of the component of vehicle speed toward or away from the base station and the component of base station speed toward or away from the vehicle.

Still more security information related to vehicle operation may be obtained from sensors (e.g., a turning sensor for producing a turning signal indicative of turn-blinker activation in a vehicle, or a hot-wire sensor for producing a hot-wire signal indicative of whether a vehicle has been hot-wired or otherwise improperly started) in a vehicle such as those found in existing OEM and after-market vehicle alarm systems. Such security information may be displayed to vehicle occupants or it may be transmitted to one or more base stations as part of a silent alarm.

Further, a plurality of base stations may be linked in a network covering a geographic area, the extent of which is a function of spacing between base stations and the effective transmission ranges of base stations in the network. One or more operators may interface with such a base station network, preferably at a central location. Note that a base station antenna may be spaced apart from its corresponding receiver and/or transmitter, being connected via one or more links known to those skilled in the art such as micro wave relays, fiber-optic cable, coaxial cable, etc.

DETAILED DESCRIPTION OF PREFERRED EMBODIMENTS

Figure 1:
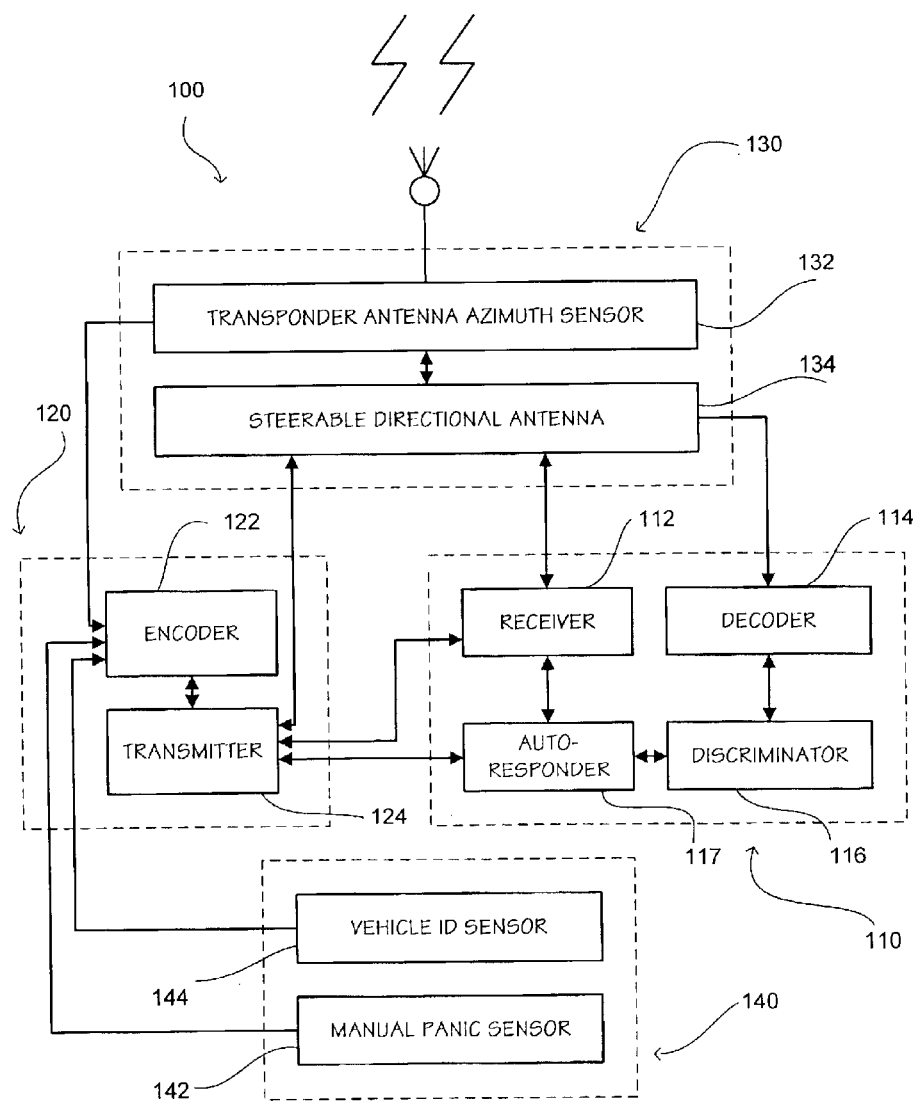
FIG. 1 schematically illustrates a vehicle-mounted addressable transponder.

Security systems of the present invention that comprise the structures described above may exist in any of several preferred embodiments. One such embodiment comprises at least one addressable transponder 100 (schematically illustrated in FIG. 1) for two-way communication with at least one base station 200 (schematically illustrated in FIG. 2).

Each base station 200 of the illustrated embodiment comprises a base station transmitter 220 that itself comprises a transmitter 224 (labeled XMTR), an encoder 222 and an effective range controller 226. Each base station 200 also comprises a base station receiver 210 that itself comprises a receiver 212, a decoder 214, and a Doppler shift detector 218. The base station transmitter 220 is connected to the base station receiver 210, and both of these structures are connected to a base station antenna 230. Base station antenna 230, in turn, comprises a steerable directional antenna azimuth sensor 232 and a steerable directional antenna 234.

Additionally, an operator interface 250, comprising a network interface 252 and an operator console 254, is connected to base station transmitter 220 and base station receiver 210. Operator interface 250 facilitates human and/or computer-aided interpretation of security information received from an addressable transponder 100 and also facilitates transmission of security information comprising security commands to one or more addressable transponders 100. Operator console 254 may be collocated physically with a base station 200 or may spaced apart from base station 200, communicating with base station 200 (and preferably other base stations) via a network interface 252 comprising wireless, wired, and/or fiber-optic links.

Communications throughout a base station network, as well as communications between base stations and transponders are facilitated by one or more transponder address registers or analogous address storage means within and/or available to each base station 200. Encoding addresses of relevant transponders (as by an alphanumeric code) in base station transmissions related to those transponders also facilitates verifying (again, as by an alphanumeric code) receipt of acknowledgment transmissions from the addressed transponder(s). Thus, in the illustrated preferred embodiment, transponder addresses are preferably stored in and/or available to decoder 214 so that security information decoded from a signal transmitted to a steerable directional base station antenna 230 by an addressable transponder 100 can be associated with an address of the transmitting transponder 100 for monitoring the transponder.

Each addressable transponder 100 of the illustrated embodiment in FIG. 1 comprises an addressable transponder transmitter 120 that itself comprises a transmitter 124 and an encoder 122. Though not illustrated in FIG. 1, an addressable transponder of the present invention may also comprise an effective range controller analogous to the effective range controller 226 illustrated in the base station of FIG. 2.

Each addressable transponder 100 also comprises an addressable transponder receiver 110 that itself comprises a receiver 112, a decoder 114, a discriminator 116 and an auto-responder 117. Though not illustrated in FIG. 1, an addressable transponder of the present invention may also comprise a Doppler shift detector 218 and/or alternative means for estimation of closing velocity such as those described herein. Decoder 114 decodes security information encoded in transmissions reaching addressable transponder 100 from one or more base stations. Discriminator 116 functions to ensure that transmissions reaching a specific addressable transponder 100 that are not in fact addressed to that transponder are rejected. Auto-responder 117 functions to ensure that an appropriately addressed trans mission reaching transponder 100 from a base station 200 is acknowledged automatically via a transmission from transponder 100 to base station 200.

The transponder transmitter 120 is connected to the transponder receiver 110, and both of these structures are connected to a transponder antenna 130. Transponder antenna 130, in turn, comprises a steerable directional antenna azimuth sensor 132 and a steerable directional antenna 134. Note that addressable transponder 100 will have, in general, a plurality of addresses stored in one or more components of the transponder, the different addresses being associated with activation of different functional features of the transponder. In addition, for example, to the automatic acknowledgement described above, a different address may optionally facilitate encoding in transmissions from transponder 100 the state of security sensors 140 connected to encoder 122. The illustrated security sensors 140 include a vehicle ID sensor 144 for providing a vehicle ID such as the Vehicle Identification Number for encoding by encoder 122 in transmissions from transponder 100. Another example of a security sensor 140 is the illustrated manual panic sensor 142, which is intended to allow a person activating sensor 142 to encode an alert for transmission to one or more base stations from transponder 100. Such an alert may simply indicate that the person activating sensor 142 is aware of a dangerous situation, or depending on the manner of activating the sensor, may indicate what the danger is.

Figure 2:
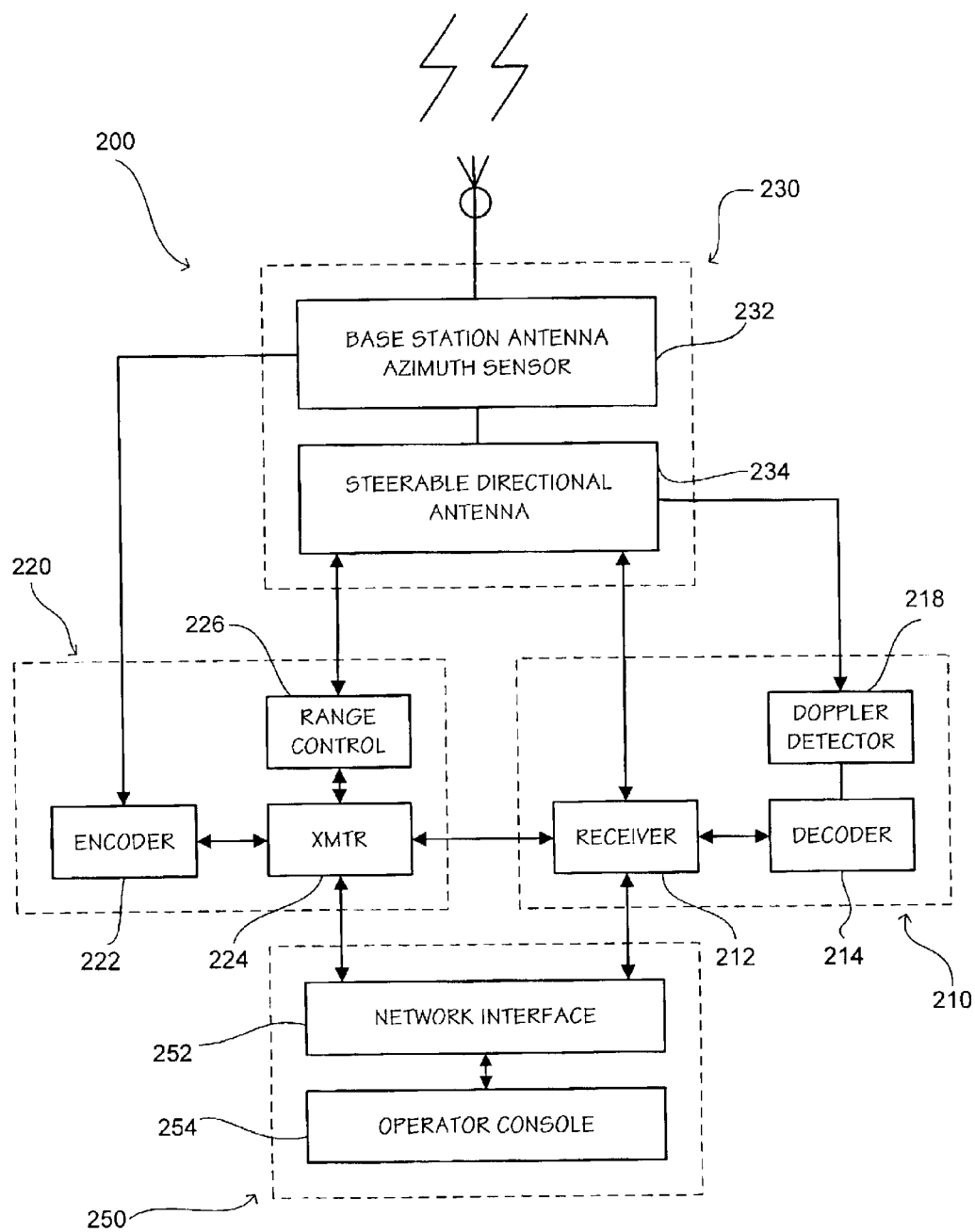
FIG. 2 schematically illustrates a base station, including a network interface, Doppler shift detector and operator interface.

Note that functional structures of addressable transponders and base stations of the present invention may or may not correspond to physical elements in a preferred embodiment. For example, a Doppler shift detector 218 and/or alternative means for estimation of closing velocity such as those described herein may be constructed from discrete electrical components on a printed circuit board, or it may be realized via a digital signal processing program in a computer comprising a central processing unit connected to computer program storage and appropriate input/output channels and/or devices. Thus, those skilled in the art will recognize that functional structures and interconnections shown in FIGS. 1 and 2 are schematic representations for illustrative purposes and may be varied to achieve the functions specified.

For clarity of illustration, addressable transponder 100 is shown without reference to a vehicle on which such a transponder may be carried. When a vehicle carries transponder 100, transponder antenna azimuth is preferably measured with respect to the vehicle (in particular, to the direction of forward travel of the vehicle). The vehicle in such a case preferably provides electrical power to transponder 100, as well as a back-up power supply in case the main vehicle power supply system fails. Further, the vehicle provides physical support to transponder 100, protecting it from weather and, preferably, from theft. Such protection may be provided by mounting transponder 100 in a relatively inaccessible location, and/or providing one or more security sensors that are activated by unauthorized attempts to remove transponder 100 from the vehicle or to break into or move the vehicle.

Note that a preferred mode of operation of transponder 100 comprises periodic transmission of security information comprising at least one address of transponder 100 (preferably relating such an address to an ID of the vehicle carrying transponder 100. This may be accomplished, for example, by maintaining the transponder in a "sleep mode" in which it consumes very little electrical power and from which it periodically (automatically) emerges to transmit security information and to receive properly addressed security information.

Note further that transponder 100 may also transmit an (aperiodic) acknowledgement of receiving a properly addressed transmission from a base station. Such a base station transmission may comprise, for example, a command for transponder 100 to increase estimated transmission range via a range controller or a command for transponder 100 to update addresses used by its discriminator. Thus, security systems of the present invention can be configured in various ways to facilitate functions such as stolen vehicle tracking and recovery, traffic monitoring and control, and implementation of emergency response plans (e.g., disaster drills). Various aspects of the invention may be reflected in methods of using these security systems to achieve certain goals.

For example, the present invention comprises methods of using the transponder antenna azimuth and base station antenna azimuth to estimate the heading of a transponder-equipped vehicle. Vehicle heading information, in turn, is useful in controlling traffic flow through the geographical area of a base station network, and may also be helpful in tracking and/or intercepting a vehicle within a base station network's geographical area.

As noted above, communication between a base station and a specific addressable transponder is facilitated because each addressable transponder in security systems of the present invention comprises transponder address storage means connected to the transponder transmitter and its addressable receiver. The transponder address storage means within an addressable transponder performs functions complementary to the transponder address storage means within a base station.

These address storage means within both transponders and base stations act together to facilitate two-way communication between one or more base stations and a specific addressable vehicle transponder, ensuring that transmissions from each base station are properly addressed and that only properly addressed transmissions are accepted by any specific addressable transponder. This specific communication is conveniently achieved through incorporation of an encoded address in each transmission of security information, with corresponding address decoding as the transmission is received at either a transponder or a base station.

To augment the specific two-way communication described above, security information comprising a specific transponder address (preferably a vehicle identification or ID) for each specific vehicle transponder, as well as a generic address for a plurality of such vehicle transponders, is preferably stored in the transponder address storage means connected to the transponder for that specific vehicle. The availability of one or more generic transponder addresss for emergency use by law enforcement or other government authority facilitates rapid and secure communications with all transponder-equipped vehicles in the geographic area of a base station network. Generic addresses can be used to identify transmissions related to certain functions (e.g., fire fighters, police) and/or to certain conditions (e.g., blockage of a freeway due to an accident).

A portion of the transponder address for a specific transponder is preferably provided by at least one vehicle ID security sensor connected to the transponder's transmitter and addressable receiver. Such a sensor might detect a vehicle identification number stored, for example, in the vehicle's engine control computer. Each transponder preferably additionally comprises at least one security sensor connected to its transmitter for providing vehicle security information indicative of security for the vehicle in which the transponder is mounted. In such transponders, at least one security sensor may comprise a manually-activated sensing element (i.e., a "panic switch").

Preferred embodiments of transponders of the present invention may additionally comprise a security warning transducer. Activation of the security warning transducer is for the purpose of informing users of the vehicle in which the transponder is mounted regarding vehicle security information related to that vehicle including, for example, generically addressed emergency-related security information.

Transponders of the present invention facilitate communication with at least one of a plurality of base stations geographically separated from other base stations and also from each transducer. Each base station, in turn, preferably additionally comprises a network interface for communicating with at least one other base station. In general, vehicle security information transmitted by a single transponder may be received by a plurality of base stations in such a network, each base station receiving the vehicle security information being within the effective range of the transponder.

As an aid in estimating the single transponder's location (and thus the location of the vehicle carrying the transponder) by using certain methods of the present invention, least one base station of the network is preferably outside the effective range of that transponder. This condition is achievable in preferred embodiments by use of an effective range controller on that transponder, the controller acting to reduce the effective range incrementally from a maximum value.

Thus, as a vehicle carrying a transponder moves throughout the geographical region encompassing such a base station network, at least one base station that was outside the transponder effective range at a first time will be expected to come within the effective range of the transponder at a second (i.e., later) time. And because of the limited effective transmission range of the vehicle transponder, at least one base station that was within the transponder effective range at such a first time will be expected to be out of the transponder effective range at such a (later) second time.

In a base station network having geographical dimensions that are large compared to the effective ranges of transponders carried by vehicles moving through the geographical region of the network, the above conditions are readily satisfied. Thus, as each such vehicle moves through the network, its location within the geographical region of the network will be indicated generally as being near the known locations of base stations within the network that are within the effective range of that vehicle's transponder. Thus, depending on the actual spacing between base stations in a network, the effective range of a transponder within that network may be adjusted via an effective range controller, preferably through a security command addressed to the transponder and transmitted from one or more of the base stations in the network.

For example, networked base stations communicating with a transponder may preferably be spaced apart geographically at distances less than approximately twice the transponder's effective transmission range. Under these conditions a transponder-equipped vehicle's location at any given time may be estimated as being within a common or overlap area encompassed by those base stations receiving the transponder's transmissions at the given time. That is, every part of the common or overlap area is within a distance equal to the transponder effective range from each receiving base station at the given time. Further, the intersection of antenna azimuths for two or more base stations in substantially simultaneous communication with a specific vehicle transponder can be used, when available, to aid in estimating the specific vehicle's location by triangulation.

Improved resolution of a vehicle's location (i.e., reduction in the size of the common or overlap area) can be achieved by reducing the transponder's effective range. But if the transponder's effective range is sufficiently reduced, it is possible that a vehicle could become "lost" (i.e., out of effective communication range) to all base stations within the network geographical area. That is, a vehicle might be at a distance from each base station that exceeds the vehicle transponder's effective range. This is undesirable. Thus, a vehicle transponder will preferably always be within the transponder's effective range of at least one network base station, with the transponder's effective range being incrementally increased as needed to maintain contact with at least one base station.

Further improved resolution of a vehicle's location may be obtained by augmenting the triangulation and/or base station area overlap techniques described above with images. Aiming, scanning and/or focusing of imaging equipment (e.g., visible spectrum and/or infrared video cameras) is preferably guided by location estimates obtained by the faster, if less precise, techniques. For example, when a moving vehicle is being tracked within the geographic area of a base station network, estimates of the vehicle's future location may be used to adjust imaging equipment prior to arrival of the vehicle. Such advance preparations may allow collection of more specific vehicle information than would be available if the vehicle arrived without notice.

To improve vehicle tracking, and perhaps make better use of available imaging equipment, the present invention comprises alternative methods to achieve improved accuracy of vehicle location without incurring the possible disadvantage of "losing" vehicles. Improved location accuracy may be indicated, for example, by a reduction in the mean squared difference between each vehicle's actual location and its estimated location. A first alternative method of improving location accuracy requires that the spacing between network base stations, as well as each vehicle transponder's effective range, be reduced. But reducing the spacing between base stations means that more base stations are required to serve a given geographic area, thus raising the overall cost of the system.

An alternative method of the present invention improves vehicle location accuracy within a base station network area at a lower overall cost while still avoiding the risk of "losing" a vehicle within the network area. This second alternative method comprises providing means for each transponder to sequentially transmit vehicle security information at a plurality of predetermined (different) estimated effective ranges. The means by which a transponder could do this may preferably comprise, for example, a stored program for controlling transmitter power levels within the transducer.

In a transponder for performing this alternative method, at least the vehicle ID and one or more transponder transmission parameters (e.g., transmitter power and/or transmitter frequencies) associated with each predetermined effective range are encoded as security information in each transmission at each respective predetermined effective range. Base stations receiving any such transmission will thus receive information on the estimated effective range of each received transmission and on the vehicle transponder making the transmission.

Transponder transmissions at relatively short estimated effective ranges will generally have transmitted power spread over a relatively wide bandwidth (and/or relatively low transmitted power) and thus be received by relatively few base stations. Transmissions at relatively longer estimated ranges will generally have transmitted power applied to a relatively narrower bandwidth and/or have a higher power so they will be received by relatively more base stations.

Thus, a plurality of vehicle location estimates, each having a different vehicle location accuracy, will generally be available for each of a series of vehicle transponder transmissions made at a plurality of effective ranges. Relatively low location error (i.e., higher accuracy) is generally associated with relatively short effective ranges of transponder transmissions, as long as such transmissions are received by at least one network base station.

Note that when vehicle location information is used for vehicle tracking, additional vehicle security information is preferably combined with vehicle location information. Such additional vehicle security information may preferably include estimated closing velocity of the tracked vehicle's addressable transponder and one or more network base stations. This closing velocity may be estimated using a Doppler shift detector and/or alternative means for estimation of closing velocity such as those described herein connected to each base receiver.

The above discussion refers to a plurality of network base stations linked to form a base station network for maintaining coordinated electromagnetic communication with vehicle transponders moving throughout a geographical region defined by the effective transponder ranges as well as the known locations of the base stations in the network. Central control of such a network, including display of vehicle security information, may be accomplished via operator interfaces located at one or more network servers, and/or distributed among one or more network base stations.

Locating and/or tracking a vehicle moving through the geographic region of a base station network is facilitated by use of the transmission range controllers mentioned above. Thus, another enhancement for security systems of the present invention comprises modifying one or more addressable transponders in a vehicle security system to additionally comprise an effective transmission range controller. The effective transmission range controller functions (as, for example, by changing the bandwidth of the transmitted signal and/or the power flow from a transponder transmitter to a transponder antenna) to alter the effective range of transmissions from such a modified transponder through a series of different values detectable (as, for example, by antenna field strength measurements) at one or more base stations. As described above, one or more series of transponder transmissions at the various effective range values can be used by methods described herein to facilitate estimating the location of vehicle transponders with respect to one or more base stations.

Still another enhancement for security systems of the present invention comprises combining security information including, but not limited to, that described above with security information available from other systems related to public safety (such as, for example, traffic control and/or identification of stolen vehicles). In preferred embodiments of the invention used in conjunction with intelligent highway and surface street systems, video security information from the intelligent systems is preferably combined to yield video representations of vehicles specifically identifiable by their transponder addresses.

Such visual identification of vehicles may be augmented by, for example, security information such as vehicle make, body style, color, and the state of vehicle turn signal lights, all of which is preferably transmitted by the vehicle transponder to one or more base stations.

In addition to the above example sys tem description, a second example description of vehicle security systems of the present invention may comprise at least one addressable transponder usable in a vehicle for two-way communication between the vehicle and at least one base station spaced apart from the vehicle.

Communication between addressable transponders and base stations is preferably via at least one wireless electromagnetic link using at least one frequency, and more preferably employs reliable and relatively low-cost ultra-wide bandwidth (UWB) and/or spread-spectrum technology analogous to that used for local computer networks and/or cellular telecommunications. Each addressable transponder comprises a transmitter connected to an addressable receiver and a steerable directional transponder antenna connected to the transmitter and the addressable receiver. Such a transponder can provide, for example, two-way communication between a base station and a specific transponder (i.e., a transponder identified by one or more specific addresses).

Note that an addressable transponder of the present invention may have an address to facilitate communication with that transponder and no other transponder. The same transponder may have one or more additional addresses usable to communicate with that transponder in addition to a plurality of other transponders. The latter communication may be desirable, for example, to transmit a warning from a base station network to vehicles within the geographic area of the network regarding a public safety emergency.

Note also that one or more antennas in addition to a steerable directional antenna may be used in either a transponder or a base station or both, depending on the desired range and/or bandwidth of transmissions employed by the transponder or base station being considered.

Security sensors for providing vehicle security information include coded-key locks, motion sensors, or glass breakage sensors in addition to the antenna azimuth sensors and vehicle ID sensors already mentioned. A security sensor may also include a manual switch (i.e., a panic button) for use by vehicle occupants to generate a security command to transmit via a transponder security information indicating a vehicle emergency. Other security sensors of various types generally indicate actual or potential problems with the vehicle and/or its occupants such as those described in U.S. Pat. No. 6,346,877 cited above.

Security actuators affecting vehicle operation and/or appearance may also be connected to vehicle transponders in certain preferred embodiments of the present invention. These security actuators may include conventional light, siren and/or horn warning systems as well as means to disable a vehicle such as ignition cut-off switches and fuel cut-off valves.

Security commands may be generated at a transponder (for example, in response to pressing a panic button), or at a base station. A base station may have access to vehicle security information received from a vehicle transponder and/or to information otherwise available from, e.g., published lists of stolen cars and/or optical character recognition of license plates scanned by a base station camera. Such information may be used, for example, to generate security commands that activate a transponder security sensor to facilitate tracking of a vehicle by law enforcement authorities.

One such transponder security sensor particularly useful in tracking a vehicle is a sensor for a vehicle ID that can uniquely identify a vehicle transmitting a particular security signal. The vehicle ID may comprise, for example, the license number and/or the unique vehicle identification number (VIN), including information on observable physical characteristics of the vehicle. Where the VIN or other vehicle ID is stored in a vehicle computer, the security sensor merely reads this stored information.

Figure 3:
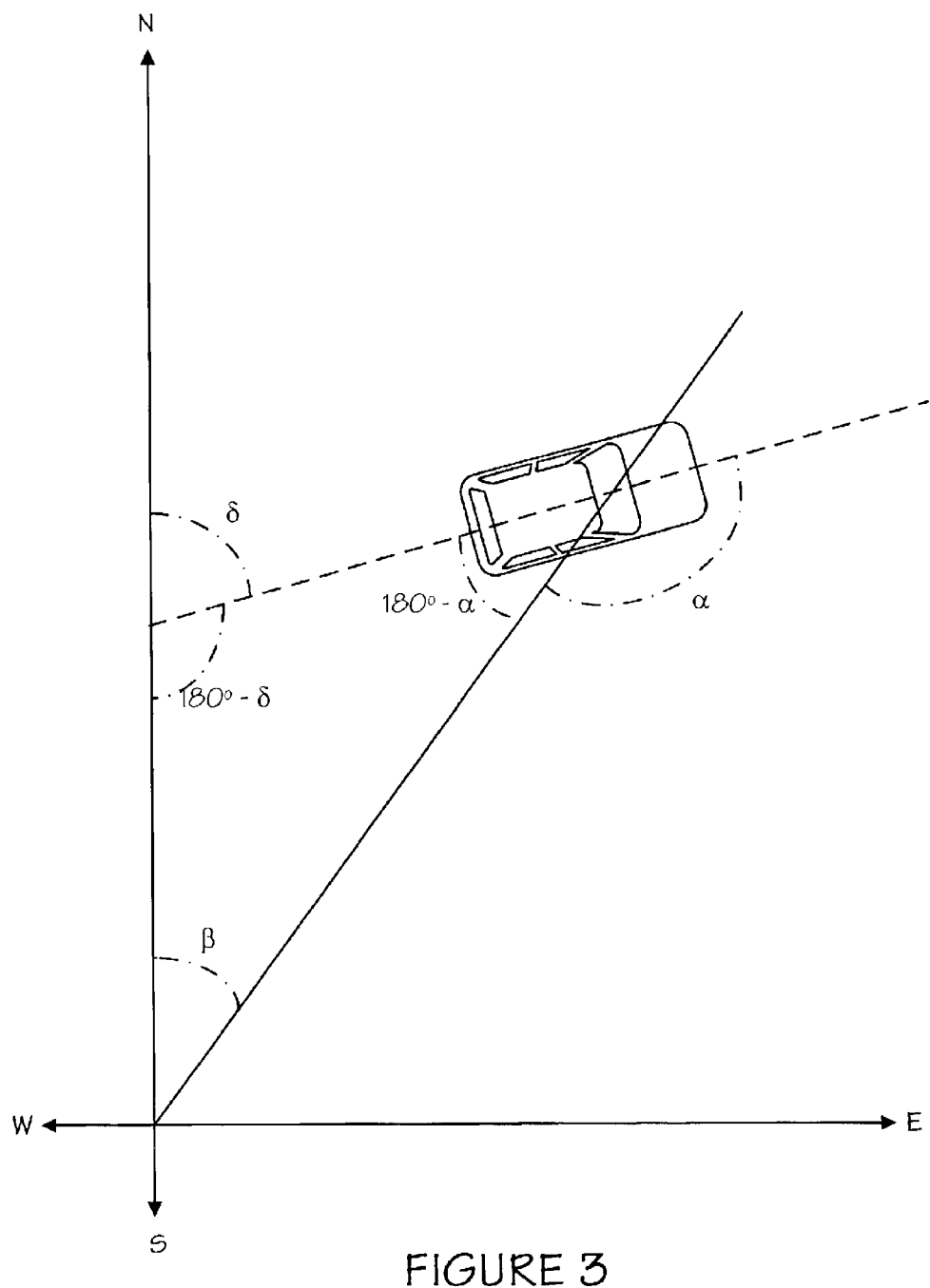
FIG. 3 schematically illustrates angular relationships between transponder and base station azimuth references.

Another security sensor useful in tracking is that for transponder antenna azimuth, which may be combined with at least one base station antenna azimuth (which may more readily be referenced to, for example, true or magnetic north), to estimate vehicle heading. Heading estimates made at one or more base stations for a particular vehicle may, in turn, may be used to facilitate tracking and/or interception of that vehicle. Referring to FIG. 3, for example, heading angle $\delta$ may be estimated by subtracting transponder antenna azimuth $\alpha$ from the sum of base station antenna azimuth $\beta$ and 180 degrees. Similar vehicle heading information is available at any base station receiving even a single transmission of vehicle security information from a vehicle transponder.

Note that speeds of first and second vehicles (obtained, for example, by direct indications from the respective speedometers) may be combined with headings of these vehicles to yield an estimate of the closing velocity of the two vehicles. First and second vehicle headings may be estimated relative to the respective azimuths of the directional antennas facilitating communication between the vehicles, and/or headings may be estimated relative to an external reference such as true north. This information may be used directly to calculate the component of each vehicle's closing velocity (i.e., the component of its speed and direction that is directed toward or away from the other vehicle). The algebraic sum of these closing velocity components (i.e., the net closing velocity) may then be compared, for example, with a closing velocity estimated from Doppler shift in communication signals passing between the vehicles. This example illustrates how the present invention can provide redundant information to increase operational flexibility and reliability under marginal operating conditions brought on by, for example, inclement weather and/or electrical interference.

U.S. patents useful in understanding the operational flexibility of the present invention include U.S. Pat. Nos. 4,761,796; 5,022,046; 5,235,329; 5,363,108; 5,448,599; 5,495,243; 5,889,475; 5,920,194; 5,963,148; 6,160,493; 6,181,996; 6,240,099; 6,281,806; 6,301,311; 6,331,997; 6,332,579; 6,351,246; and 6,351,652, each patent incorporated herein by reference.

Further redundancy may be obtained, for example, through the addition of specialized receivers for time standard signals to transmitters of the present invention. Time standard signals, such as those broadcast by WWW and/or by appropriately placed repeaters, may be used to synchronize clocks connected to transmitters and/or receivers to facilitate distance and/or velocity estimates.

Such estimates may be made by encoding the time of a signal's transmission in the signal as it is transmitted, and then noting the difference between the time of signal transmission and the time when the signal is received and decoded at a distant point. If a single time standard is economically available at both transmitter and receiver, then the time difference (i.e., the elapsed time for signal travel) can be multiplied by the estimated signal velocity to obtain an estimate of the distance separating the transmitter from the receiver. Serial estimates of these separation distances at known time intervals may be used to estimate closing velocity between the transmitter and receiver. These distance and closing velocity estimates may be used independently or compared with analogous estimates obtained by other means as described herein to yield a higher level of confidence in the estimates. Preferred embodiments of the invention may employ one or more such redundancies to improve reliability through skillful application of information derivable from use of the invention.

One such skillful application relevant to the above description comprises steering the directional transponder and base station antennas of the present invention according to a predetermined protocol (e.g., uniform rotational increments about a vertical axis), or steering the antennas so as to optimize the transmission and/or reception of command signals and/or security signals. Thus used, directional antennas on vehicle transponders and base stations act together to furnish reliable heading information for a vehicle at a distance without the cost and complexity of GPS and without the uncertain errors of magnetic compasses.

Additionally, steerable directional antennas provided for transponders and command receiver-transmitters of the present invention allow electromagnetic signal transmission at relatively low power levels because radiated electromagnetic energy is concentrated in a relatively narrow beam rather than being broadcast uniformly in all directions. See, for example, U.S. Pat. Nos. 6,323,802; 6,313,795; and 6,313,794, all incorporated herein by reference. For ease of installation and rapid response, antennas of the present invention are preferably electronically steerable as, for example, described in U.S. Pat. No. 6,288,682, incorporated herein by reference. Where an antenna is electronically steered, a security sensor merely reads the electronic set point identified in a steering command. Such an antenna may have no moving parts and no rotational inertia.

Thus, a steerable antenna may be used to quickly scan all or any desired subset of horizontal directions (i.e., antenna azimuths) in either a transmitting or receiving mode. In the present invention, steerable antennas are used to improve the reliability of low-power communications between a transponder and base station, and/or to provide information on the location of a transponder with respect to a base station. For example, by noting the azimuth on which reception of a transmission from a transponder is optimized (e.g., the azimuth on which the received signal has the greatest signal-to-noise ratio or has maximum amplitude), the radial direction of the transponder relative to the base station receiving the signal may be estimated.

When two or more base stations having known (separate) locations receive near-simultaneous (e.g., closely spaced sequential) security signals from a single transponder, the location of the transponder can be estimated by triangulation (i.e., finding the intersection of the respective base station antenna azimuths). Alternatively, a plurality of different security signal transmissions from a vehicle-mounted transponder may be received by a single base station. If two or more of these transmissions are received on different base station antenna azimuths, the different azimuths may be combined with other information such as transponder antenna azimuth, vehicle speed and closing velocity with the base station to estimate the vehicle location with respect to the base station. Closing velocity in this instance may be estimated from Doppler shift in the signals received at the base station and/or by alternative means for estimation of closing velocity such as those described herein.

Further, since the instantaneous azimuth of the transponder directional antenna transmitting a security signal is preferably encoded as part of the transmitted security signal, the real-time orientation of the vehicle carrying the transponder may also be estimated. Because vehicle orientation may change continuously for a vehicle in motion, a preferred mode of security signal transmission from a moving vehicle transmitting vehicle security information is a continuous horizontal scan comprising a plurality of individually encoded transmissions.

Whereas a portion of the vehicle security information (such as the vehicle ID) may be identical in all of the transmissions in this example, successive transmissions will generally have differing transponder antenna azimuths unless the vehicle is traveling directly toward or directly away from the base station receiving the transmissions. In the latter case, the magnitudes of closing velocity and vehicle speed will be equal.

Since the angular relationship of a vehicle transponder and a base station antenna azimuth are generally variable, a horizontal scan may preferably be substantially uniform if, for example, the locations of base stations near the path of vehicle travel are not known a priori. On the other hand, if a path of vehicle travel is known prospectively, a vehicle's progress along that path may be efficiently followed if the transponder directional antenna is steered so as to keep it aimed at successive base stations along the vehicle path.

What is claimed is:

1. A vehicle security system comprising at least one addressable transponder for receiving security information addressed to it from at least one base station, and for transmitting security information to at least one said base station, each said transponder comprising an addressable transponder receiver;

an addressable transponder transmitter connected to said transponder receiver; and a transponder antenna connected to said transponder receiver and said transponder transmitter; and at least one said base station for receiving security information transmitted from at least one said transponder, for transmitting security information addressed to at least one said transponder, and for communicating security information with at least one operator, each said base station comprising a base station receiver;

a base station transmitter connected to said base station receiver;

a base station antenna connected to said base station receiver and said base station transmitter; and an operator interface connected to said base station receiver and said base station transmitter for bidirectional communication with at least one operator of security information received at and security information transmitted by each said base station; and wherein each said transponder antenna comprises a steerable directional antenna and a steerable directional antenna azimuth sensor for providing security information comprising a transponder antenna azimuth indicative of each azimuth to which said steerable directional transponder antenna is steered; and wherein each said base station antenna comprises a steerable directional antenna and a steerable directional antenna azimuth sensor for providing security information comprising a base station antenna azimuth indicative of each azimuth to which said steerable directional base station antenna is steered; and wherein each said transponder receiver comprises a discriminator for rejecting base station transmissions not addressed to said transponder, together with a decoder to decode security information encoded in base station transmissions addressed to said transponder; and wherein each said transponder transmitter comprises an encoder for encoding security information comprising an address for said transponder and said transponder antenna azimuth in each transmission from said transponder; and wherein each said base station receiver comprises a decoder to decode security information encoded in transmissions received from at least one said transponder; and wherein each said base station transmitter comprises an encoder for encoding security information comprising at least one transponder address in each transmission from said base station to at least one addressable transponder.

2. The security system of claim 1 wherein at least one said base station additionally comprises a range controller connected to said base station transmitter and said operator interface for controlling the effective range of transmissions from at least one said base station.

3. The security system of claim 1 wherein at least one said transponder additionally comprises a range controller connected to said transponder transmitter for controlling effective transmission range for at least one said transponder.

4. The security system of claim 1 wherein at least one said base station additionally comprises means for estimating closing velocity connected to said base station receiver and said operator interface for estimating closing velocity of at least one said transponder with at least one said base station.

5. The security system of claim 1 wherein at least one said transponder additionally comprises a turning sensor for producing a turning signal indicative of turn-blinker activation in a vehicle, said turning sensor being connected to said transponder transmitter encoder for encoding said turning signal for transmission to at least one said base station.

6. The security system of claim 1 wherein at least one said addressable transponder comprises a hot-wire sensor for producing a hot-wire signal indicative of unauthorized starting of a vehicle motor, said hot-wire sensor being connected to said transponder transmitter encoder for encoding said hot-wire signal for transmission to at least one said base station.

7. The security system of claim 1 wherein at least one said addressable transponder comprises a panic sensor for producing a panic signal indicative of manual activation of said sensor by a vehicle occupant, said panic sensor being connected to said transponder transmitter encoder for encoding said panic signal for transmission to at least one base station.

8. The security system of claim 1 wherein at least one said transponder comprises an auto-response sensor for producing an auto-response signal indicative of reception of an auto-response command from at least one said base station via said transponder antenna and said transponder receiver, said auto-response sensor being connected to said transponder transmitter encoder for encoding said auto-response signal for transmission to at least one said base station.

9. A method of monitoring a vehicle on which an addressable transponder is mounted, the method comprising transmitting a first signal from a base station to said addressable transponder via said steerable directional base station antenna, said first signal encoding an address for said transponder, and said base station antenna having been steered to a base station antenna azimuth;

receiving said first signal at said transponder via a steerable directional transponder antenna, said transponder antenna having been steered to a transponder antenna azimuth;

transmitting a second signal from said transponder to said base station for acknowledging receipt of said first signal at said transponder, said second signal encoding said transponder address and said transponder antenna azimuth;

receiving said second signal at said base station;

decoding said second signal to obtain a received-decoded transponder address and to obtain a received-decoded transponder antenna azimuth;

subtracting said received-decoded transponder antenna azimuth from said base station antenna azimuth to form an antenna azimuth difference;

adding 180 degrees to said antenna azimuth difference to estimate said vehicle heading; and associating said received-decoded transponder address with said estimated vehicle heading to monitor said vehicle.

10. The method of claim 9 wherein said base station antenna azimuth and said estimated vehicle heading are relative to true north.

11. The method of claim 9 wherein said transponder antenna and said base station antenna are each electronically steerable.

12. The method of claim 9 wherein said first signal and said second signal each comprises a plurality of wavelengths.

13. The method of claim 9 wherein said first signal and said second signal each comprises at least one digital packet.

14. The method of claim 9 wherein said first signal has a predetermined effective range, said first signal encoding said predetermined effective range in addition to said transponder address.

15. A method for monitoring a vehicle on which an addressable transponder is mounted, the method comprising transmitting a signal from said addressable transponder to a base station to via a steerable directional transponder antenna, said transponder antenna having been steered to a transponder antenna azimuth relative to said vehicle, and said signal encoding at least an address of said transponder and said transponder antenna azimuth;

receiving said transmitted signal at said base station via a steerable directional base station antenna, said base station antenna having been steered to a base station antenna azimuth;

decoding said received signal to obtain at least said transponder address and said transponder antenna azimuth;

subtracting said transponder antenna azimuth from said base station antenna azimuth to form an antenna azimuth difference;

adding 180 degrees to said antenna azimuth difference to estimate said vehicle heading relative to said base station; and associating said transponder address with at least said vehicle heading for monitoring said vehicle.

16. The method of claim 15 wherein said signal is transmitted periodically.

17. The method of claim 15 wherein said signal encodes speed of said vehicle in addition to said transponder address and said transponder antenna azimuth, and wherein said signal is decoded to obtain vehicle speed in addition to said transponder address and said transponder antenna azimuth, and wherein said vehicle is monitored by associating said vehicle speed and said vehicle heading with said transponder address.

18. The method of claim 15 wherein said signal is transmitted on manual activation of a panic sensor connected to said transponder, and wherein said signal encodes an indication of said panic sensor activation in addition to said transponder address and said transponder antenna azimuth, and wherein said signal is decoded to obtain said indication of said panic sensor activation in addition to said transponder address and said transponder antenna azimuth, and wherein said vehicle is monitored by associating said indication of said panic sensor activation and said vehicle heading with said transponder address.

19. The method of claim 15 wherein said signal is transmitted on activation of a hot-wire sensor connected to said transponder for indicating unauthorized starting of said vehicle's motor, and wherein said signal encodes an indication of said hot-wire sensor activation in addition to said transponder address and said transponder antenna azimuth, and wherein said signal is decoded to obtain said indication of said hot-wire sensor activation in addition to said transponder address and said transponder antenna azimuth, and wherein said vehicle is monitored by associating said indication of hot-wire sensor activation and said vehicle heading with said transponder address.

20. The method of claim 15 wherein said transmitted signal comprises a plurality of wavelengths.

* * * * *